United States Patent [19]
Chapman

[11] Patent Number: 5,704,623
[45] Date of Patent: Jan. 6, 1998

[54] MOBILE CAMERA CRANE BASE

[75] Inventor: Leonard T. Chapman, North Hollywood, Calif.

[73] Assignee: Chapman/Leonard Studio Equipment, North Hollywood, Calif.

[21] Appl. No.: 574,841

[22] Filed: Dec. 19, 1995

Related U.S. Application Data

[63] Continuation-in-part of Ser. No. 516,585, Aug. 18, 1995, which is a continuation-in-part of Ser. No. 509,792, Aug. 1, 1995.

[51] Int. Cl.$^6$ .................................................. B62D 7/06
[52] U.S. Cl. .................. 280/47.11; 280/103; 280/91.1
[58] Field of Search ........................... 280/47.11, 47.34, 280/103, 81.5, 846, 91.1, 444; 180/19.2; 396/419; 248/177.1

[56] References Cited

U.S. PATENT DOCUMENTS

| | | | |
|---|---|---|---|
| 718,440 | 1/1903 | Elsner | 280/103 |
| 903,185 | 11/1908 | Geiger et al. | 280/103 |
| 1,080,035 | 12/1913 | Wheelock | 280/444 |
| 2,047,206 | 7/1936 | Knapp | 280/103 |
| 2,145,033 | 1/1939 | Tondreau | |
| 2,228,247 | 1/1941 | Cunningham | 280/47.11 |
| 2,566,565 | 9/1951 | Hill | |
| 2,584,672 | 2/1952 | Clemons | 280/103 |
| 3,195,915 | 7/1965 | Moore | 280/103 |
| 3,211,467 | 10/1965 | Siddall | 280/103 |
| 3,297,337 | 1/1967 | Sargent | |
| 3,410,571 | 11/1968 | Bishop | 280/103 |
| 4,003,584 | 1/1977 | Zelli | |
| 4,566,391 | 1/1986 | Haberl et al. | 280/91.1 |
| 4,589,702 | 5/1986 | Bach et al. | 301/5.3 |
| 5,174,593 | 12/1992 | Chapman | |
| 5,312,121 | 5/1994 | Chapman | 280/47.11 |

FOREIGN PATENT DOCUMENTS

| | | |
|---|---|---|
| A734762 | 1/1939 | France . |
| 3739471 A1 | 6/1989 | Germany . |

OTHER PUBLICATIONS

The Hybrid Dolly brochure, Leonard Studio Equipment, Inc. (1990).
Zeus Stage Crane brochure, Leonard Studio Equipment, Inc. (1988).
Peewee/Hybrid Dolly Transmission brochure, Leonard Studio Equipment, Inc. (1992).
Hybrid High–Post Set-Up/Hybrid Low–Post Set-Up brochure, Leonard Studio Equipment, Inc. (1992).
J.L. Fisher Inc. Catalog, 5 pages.

*Primary Examiner*—Brian L. Johnson
*Assistant Examiner*—Min Yu
*Attorney, Agent, or Firm*—Lyon & Lyon LLP

[57] ABSTRACT

A mobile base for supporting a camera crane arm includes a chassis having front and rear pairs of wheels. Front and rear steering angle compensators are linked respectively to the front and rear wheel pairs. The compensators are pivotally mounted to the chassis. Ground wheels and bogey track wheels are mounted on a kingpin/axle housing at each corner of the mobile base. Kingpins threaded into the kingpins/axle housings act as jacking posts. The mobile base may be steered by one or two operators in various steering modes.

19 Claims, 8 Drawing Sheets

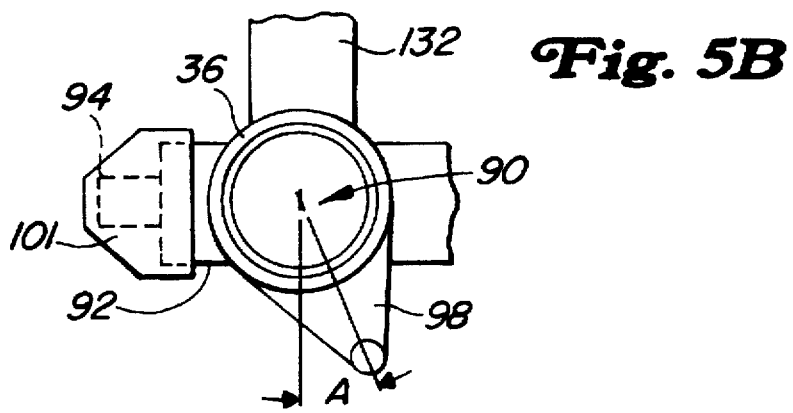
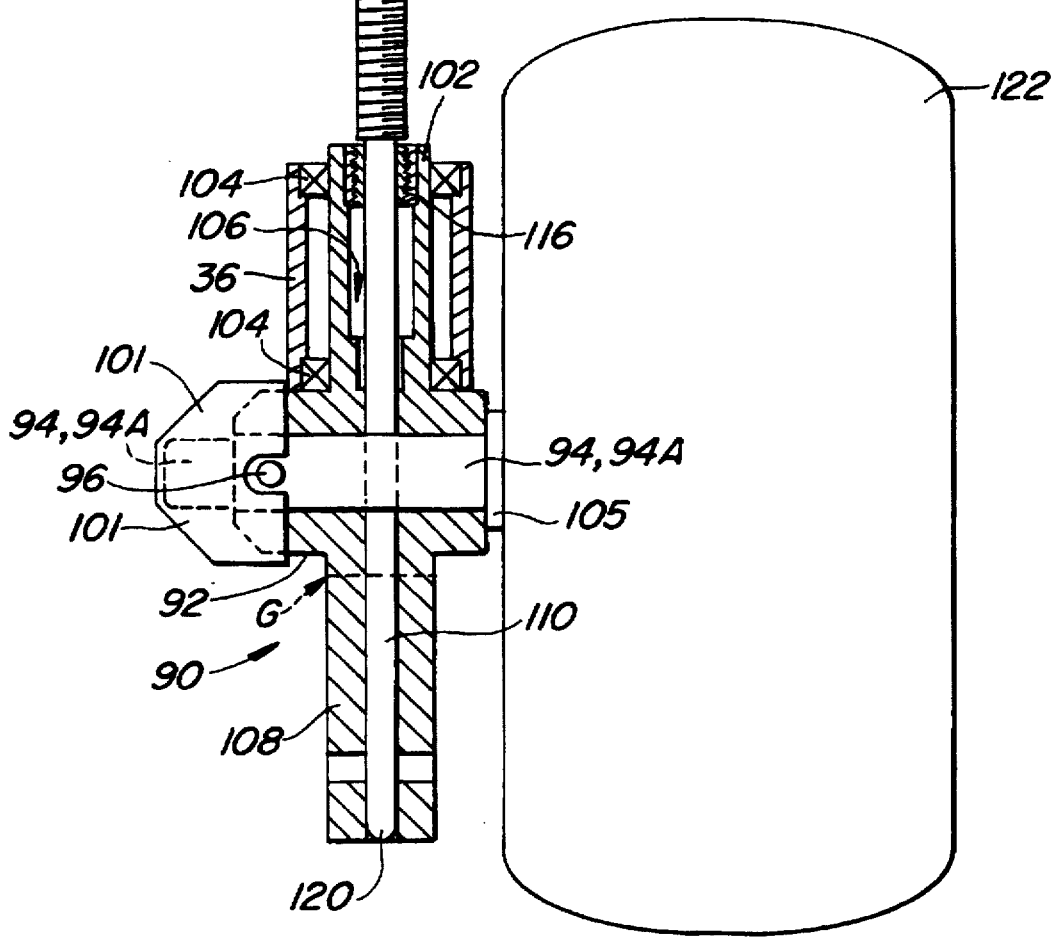
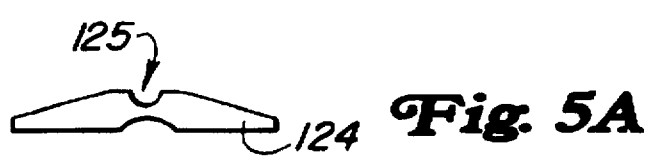

MOBILE CAMERA CRANE BASE

This application is a continuation-in-part of Ser. No. 08/516,585, filed on Aug. 18, 1995, and now pending, which is a continuation-in-part of Ser. No. 08/509,792 filed on Aug. 1, 1995, and now abandoned, both incorporated herein by reference.

BACKGROUND OF THE INVENTION

The field of the invention is camera cranes and dollies.

Camera cranes and dollies are used to position and maneuver motion picture or video cameras. Camera cranes typically have a crane arm mounted onto a mobile base or vehicle, with a camera platform at one end, and counterweights at the other end of the arm. The arm can be pivoted or tilted up or down, and panned from side to side, to obtain a desired camera position, while the mobile base remains stationary. To follow a moving subject during filming, or to move the camera around a subject, move in, back-up or move diagonally in any direction, the motion base is pushed (or self-propelled) over the ground. The motion base may also be moved on tracks, where the ground or floor is too irregular for smooth filming.

As filming often takes place outside of a studio (on location), the mobile base is advantageously portable, so that, if necessary, it can be carried to the filming location by the film crew. Accordingly, the mobile base is advantageously light weight and compact. On the other hand, the mobile base should be able to provide a steady and rigid platform for supporting and moving a crane arm. To reduce vibration, noise and unwanted movement, mobile camera crane bases often have steering transmissions or compensators intended to provide geometrically corrected "perfect" steering. The corrected steering tends to reduce or eliminate tire scrubbing or scuffing and rolling friction, when the mobile base is steered on a curved path. Steering angle correction is well known in the camera crane and dolly industry, as shown, for example, in my U.S. Pat. No. 5,174,593, incorporated herein by reference.

While various mobile camera crane bases having differing features and advantageous have successfully been used in the past, there remains a need for an improved mobile camera crane base which can be easily transported, provides advantageous steering characteristics, and a stable and rigid yet adjustable platform for a camera crane arm or other payload.

SUMMARY OF THE INVENTION

To these ends, a mobile camera crane base preferably includes a pair of front wheels, and a pair of rear wheels rotatably attached to the chassis. Front and rear steering angle compensators, advantageously pivotally attached to the chassis, interconnect the left and right wheel of the front and rear wheel pairs. In a preferred embodiment, the mobile base is substantially symmetrical front to back, and side to side. A centerpost may be pivotally mounted to the chassis to support and level a camera crane arm. The steering compensator most desirably can provide crab steering and corrective steering.

Accordingly, it is an object of the invention to provide an improved mobile camera crane base. Other and further objects and advantageous will appear hereinafter.

BRIEF DESCRIPTION OF THE DRAWINGS

In the drawings, wherein similar reference characters denote similar elements throughout the several views:

FIG. 5 is a partial front elevation view of the kingpin/axle housing shown in FIG. 4;

FIG. 5A is a front elevation view of a jacking pad;

FIG. 5B is a partial plan view of the kingpin/axle housing of FIG. 5;

DETAILED DESCRIPTION OF THE PREFERRED EMBODIMENTS

Figure 1:
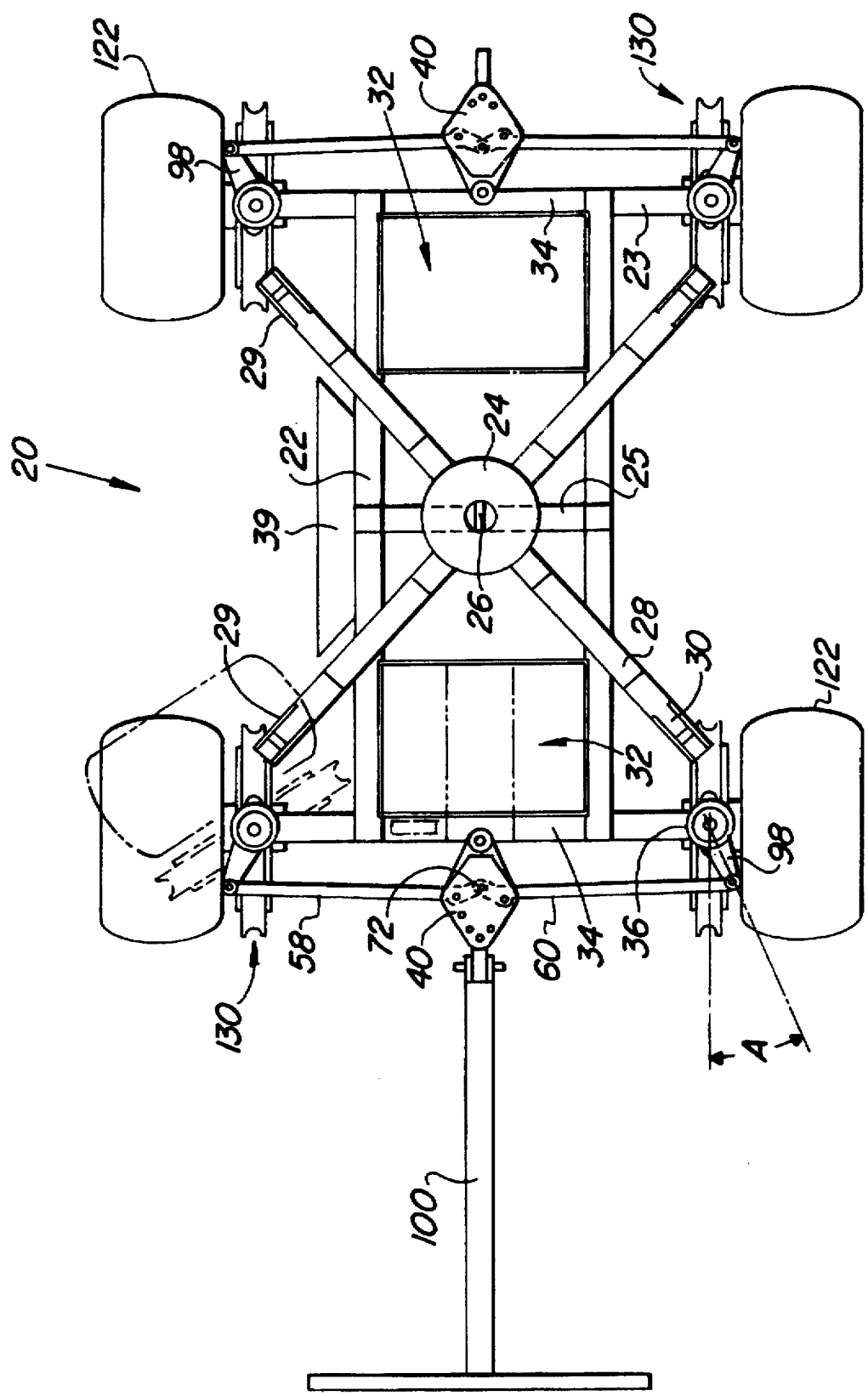
FIG. 1 is a plan view of the present mobile camera crane base.
Figure 2:
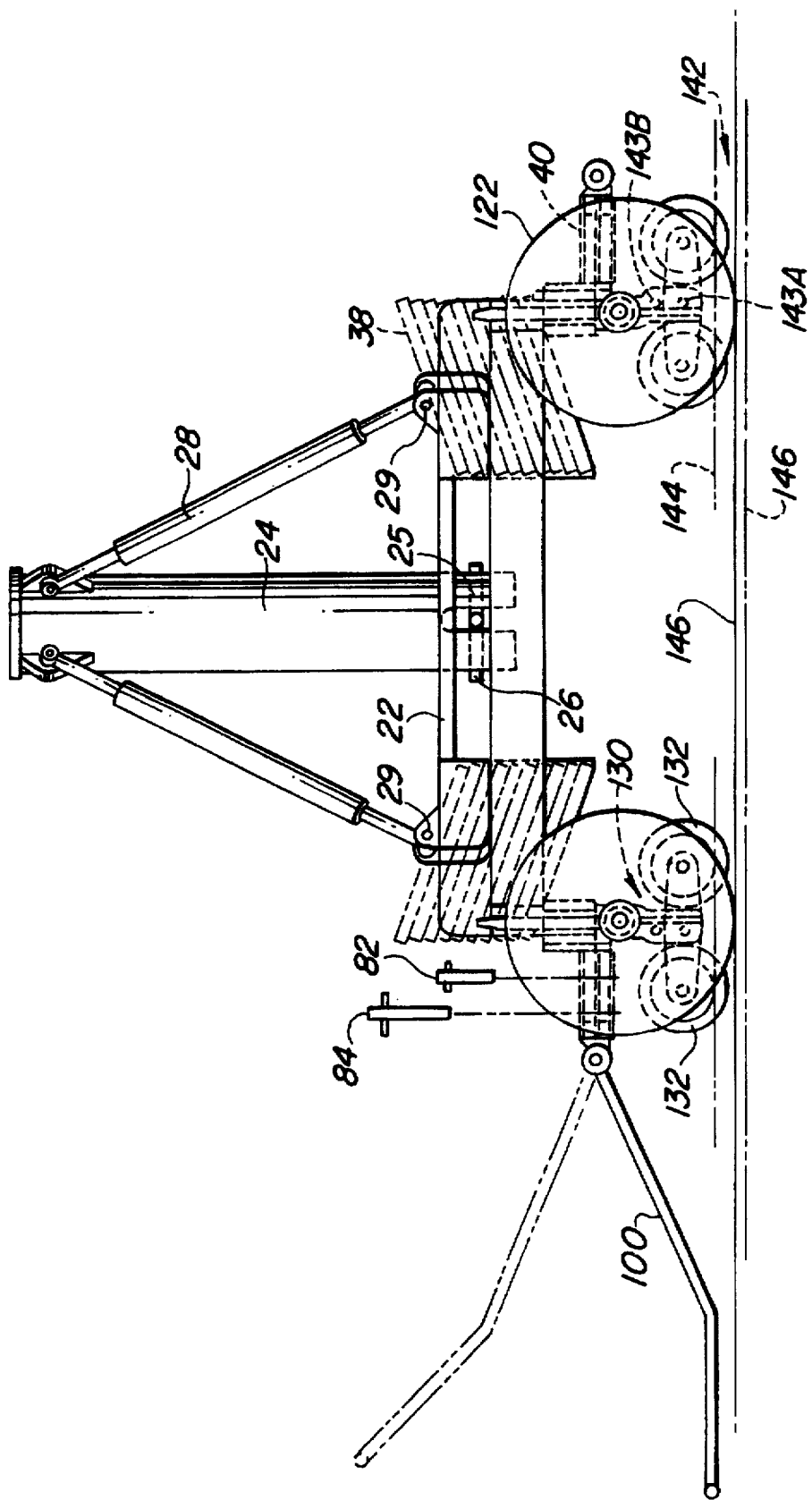
FIG. 2 is a side elevation view thereof.

Turning now in detail to the drawings, as shown in FIGS. 1 and 2, the present mobile camera crane base 20 includes a generally rectangular chassis 22. A centerpost 24 is pivotally supported on a cross bar 25 by a quick release center pin 26. Four turn buckles 28 extend from the top of the centerpost 24 to support arms 30 on the chassis. Quick release pins 29 attach the lower ends of the turn buckles 28 to clevises on the support arm 30, as described in detail in my U.S. Pat. No. 5,312,121, incorporated herein by reference.

The chassis 22 advantageously is formed as a steel box section weldment having perpendicular extensions 23 at the corners. Weight buckets 32 are provided on the chassis 22 at the front and back ends. Lead weights 38 may be stored and carried in the weight buckets 32, to counterbalance an arm mounted on the mobile base 20, and to stabilize the mobile base. The area below the centerpost 24 is preferably open. End beams 34 extend across the front and back ends of the chassis 22, aligned with the chassis extensions 23 at the corners. Kingpin tubes 36 are attached at the end of each of the chassis extensions 23.

A tool box 39 is advantageously centrally attached to the chassis 22.

Figure 3:
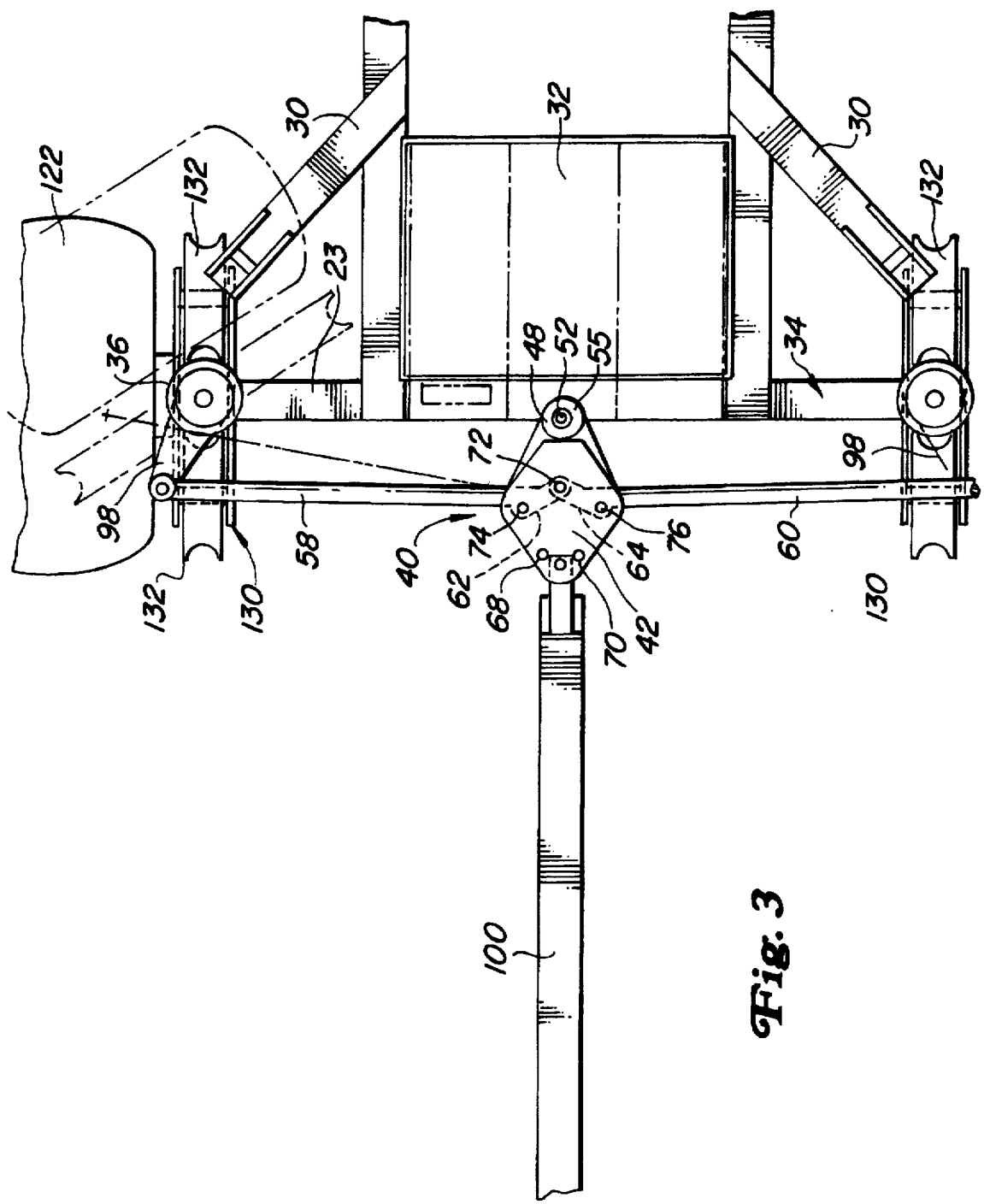
FIG. 3 is an enlarged plan view of one end thereof.
Figure 4:
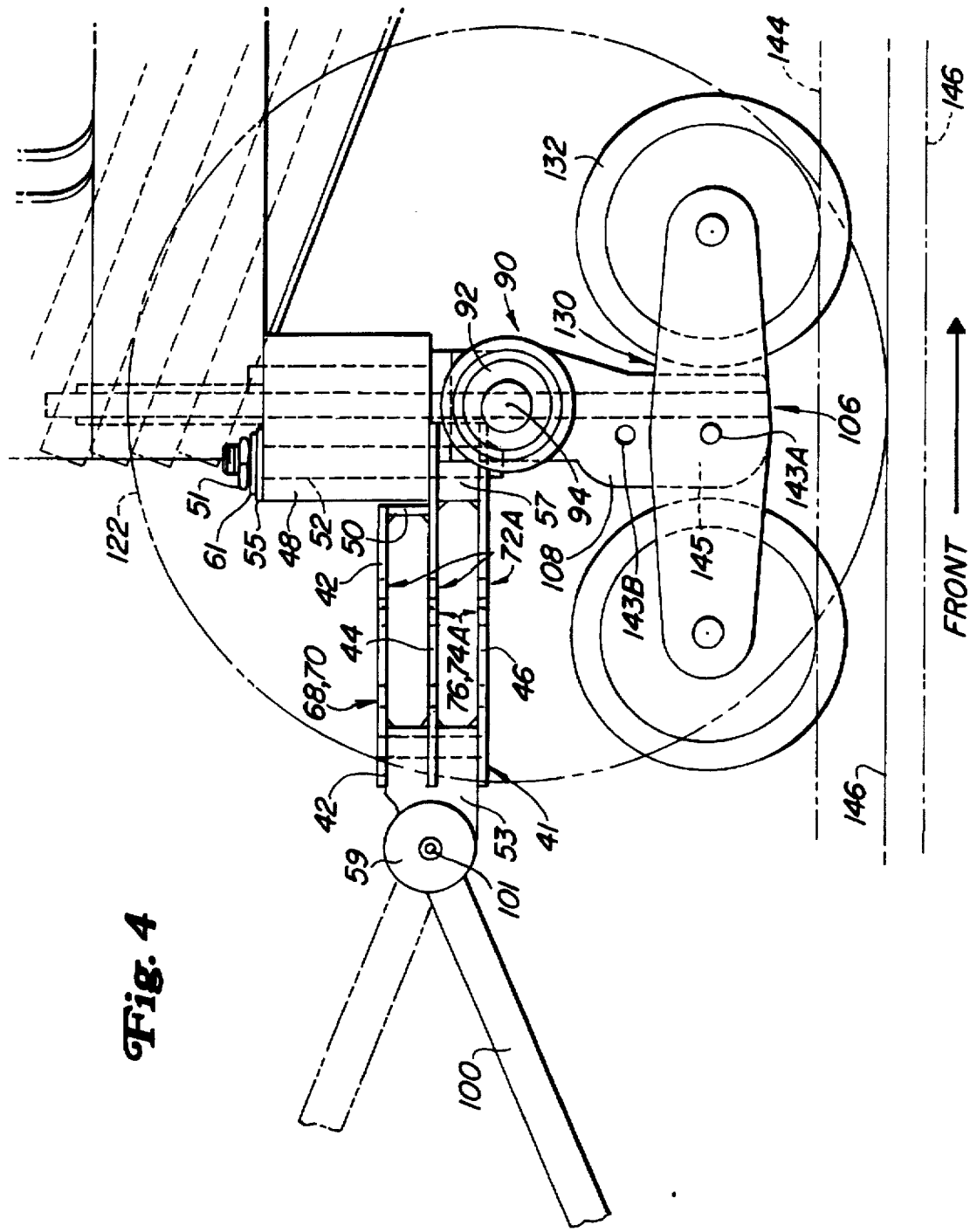
FIG. 4 is an enlarged side elevation view of a steering compensator and a kingpin/axle housing of the mobile base shown in FIGS. 1 and 2.

Turning to FIGS. 3 and 4, only one end of the mobile base 20 is illustrated in detail, as the other end is preferably substantially the same in all significant aspects. Either end may be the front or back of the mobile base, as the structure and operation of each is similar.

As shown in FIGS. 3 and 4, a steering angle compensator or transmission 40 has a housing 41 including a top plate 42, center plate 44, and bottom plate 46. As shown in FIG. 4, the "back" ends of the plates are joined, preferably welded, to a lug 53, including a lug tab 59. A handle 100 is attached to the tab 59 with a quick release pin 101. The "front" ends of the top plate 42 and center plate 44 are joined to a vertical support plate 50. A compensator housing mounting boss 48 on the end beam 34 of the chassis 22, surrounds a housing pivot stud which also extends through and is fixed or pressed into a housing mounting boss 57 joined to the center plate 44 and bottom plate 46 of the housing 41. The stud 52 engages a nut 51 on top of the boss 48. Low friction washers e.g. steel and Teflon, 55 and 61 are provided under the head of the nut 51, and in between the bearing surface between the transmission housing 41, and the lower surface of the mounting boss 48, so that the housing 41 can pivot freely on the chassis 22. The compensator housing 41 is advantageously formed as a weldment.

Referring to FIG. 3, left and right steering links 58 and 60 each include an end segment 62 and 64. Each end segment 62, 64 includes a center hole 72, and a crab steering hole 74, 76, respectively. Although the steering links 58 and 60 and their end segments 62 and 64 may be identical, the right link 60 is positioned above the left link 58, they may be made with slight bends or contours to provide added clearance at extreme steering angles. Turning momentarily to FIG. 4, the compensator housing 41 is shown without the steering links 58 and 60 in place, for clarity of illustration. The housing 41 has center holes 72A and crab steering holes 74A, 76A, extending through the top, center and bottom plates, and arranged to align with the center holes 72 and crab holes, 74, 76 in the steering links 58, 60. Referring back to FIG. 3, quick release pin storage holes 68 and 70 are provided in the compensator housing 41, adjacent to the lug 53.

Referring to FIGS. 4 and 5, a kingpin/axle housing 90 is pivotally supported at each kingpin tube 36. Each kingpin/axle housing 90 has a hub 92 which slidably receives an axle 94 supporting a wheel 122. As a stop on the axle 94 comes to rest against the side of the kingpin/axle housing 90, a locking pin hole 96 in the housing 90 aligns with a corresponding hole in the axle 94, allowing a locking pin 95 to be installed, to lock the axle in position. Wheel bearings are provided at the hub of the ground wheel 122 (not shown). A bogey track wheel assembly is preferably pivotally mounted on the kingpin/axle housing.

Turning now to FIG. 5, the kingpin/axle housing 90 includes an upper tube 102 supported by upper and lower bearing 104 within the kingpin tube 36. The upper bearing 104 is held in place by a ring 109. A stepped bore 106 extends vertically entirely through the kingpin/axle housing 90. A lower block 108 having flat sides extends below the hub 92. The bore 106 extends through the block 108. A jackscrew 110 has an upper threaded section 112 connected by a shaft section 118 to a spherical end 120. A nut or hex section 114 at the top of the jackscrew 110 allows the jackscrew to be turned with a hand tool 115. The hand tool may be a wrench, or it can be a lever permanently attached to the nut 114. Alternatively depending on the application and loading, the nut 114 can be turned by hand. The shaft section 118 of the jackscrew extends through a clearance hole in the axle 94. The threaded section 112 of the jackscrew engages bore threads on a threaded steel insert 116 within the upper tube 102 of the housing 90. Shaft section 118 is slidably and rotatably fitted within the block 108.

As shown in FIG. 5A, an accessory jacking pad 124 may be provided with the mobile base 20, to distribute the weight of the mobile base and payload when it is supported on the jackscrews 110. The jacking pad 124 includes a recess 125 configured to meet with the spherical end 120 of the jackscrew 110.

Referring to FIGS. 3 and 5B, a steering arm 98 is attached to the kingpin/axle housing 90, approximately at the height of the hub 92, and extends outwardly at angle A, preferably of about 22½ degrees. The kingpin/axle housings are diagonally interchangeable on the chassis 22.

Figure 6:
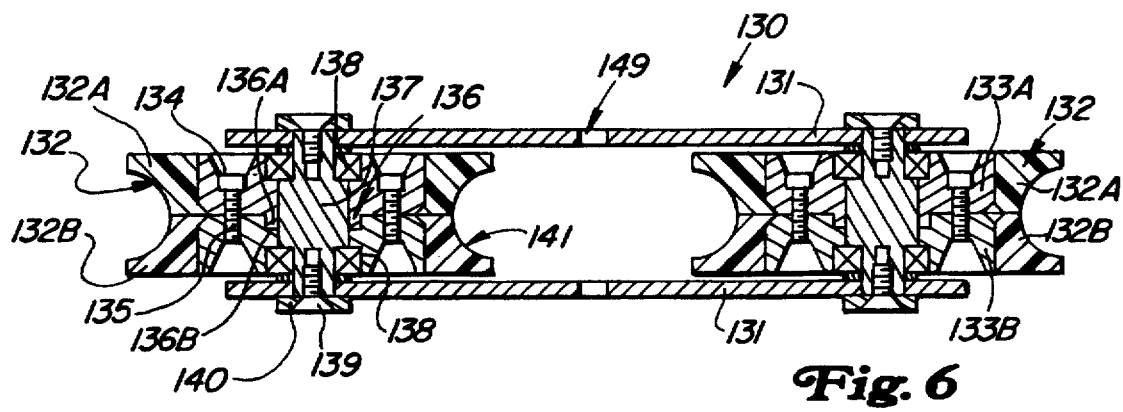
FIG. 6 is a plan view in part section of a bogey track wheel assembly which may be used on the mobile camera crane base shown in FIGS. 1 and 2.

With reference to FIG. 6, each bogey track wheel assembly 130 includes a pair of bogey wheels 132, each having a left half wheel formed by a left half tire 132A and left hub 133A, and a right half wheel formed by a right half tire 132B and right half hub 133B. Caps screws 134 extend through clearance holes in the left hub 133A and engage threaded holes 135 in the right hub 133B. Preferably, for precise alignment, the left and right half hubs have a joggle 136 formed by a joggle hub 136A and a mating joggle recess 136B. A bogey axle 137 supports the hubs on bearings 138, and is attached to side plates 131 via axle bolts 139 passing through end caps 140. The bogey wheels 132 have a track radius 141 for engaging and rolling on camera dolly/crane track, used in the motion picture and television industries to provide a smooth rolling surface for a camera base or dolly, when the floor or ground surface is irregular.

Referring to FIG. 4, the lower block 108 of the kingpin/axle housing 90 has a forward offset 145 having upper and lower bogey track wheel assembly mounting holes 143B and 143A, extending through the kingpin/axle housing behind the bore 106. Pivot mounting holes 149 are centrally provided in the side plates 131 of the bogey track wheel assembly 130. The bogey track wheel assembly 130 is ordinarily mounted to the lower end of the kingpin/axle housing 90 by a bolt or pin 147 extending through the bogey holes 149 and the side plates 131 and through the lower mounting hole 143A. In this position, the bogey wheels 132 are suspended above the ground, as the mobile base rolls on the ground wheels 122. For additional clearance, the bogey track wheel assembly may be raised up by attaching it through the kingpin/axle housing 90 using the upper mounting hole 143B.

Figure 7:
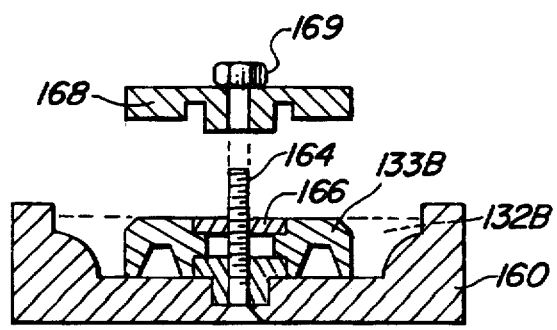
FIG. 7 is an exploded section view of a molding tool used in manufacturing the track wheels shown in FIG. 6.

Referring to FIG. 7, a wheel half molding tool 160 includes a hub centering threaded rod 164, for centering hub 133A, 133B on hub 166. A hub nut 169 clamps a plate 168 into position. Urethane, or similar material, is placed within the molding tool 160 and hardens into a tire half, used in the assembly 130 as the left and right sides 132A, 132B. To improve concentricity and appearance, the outer or pour side is faced off or machined.

Figure 8:
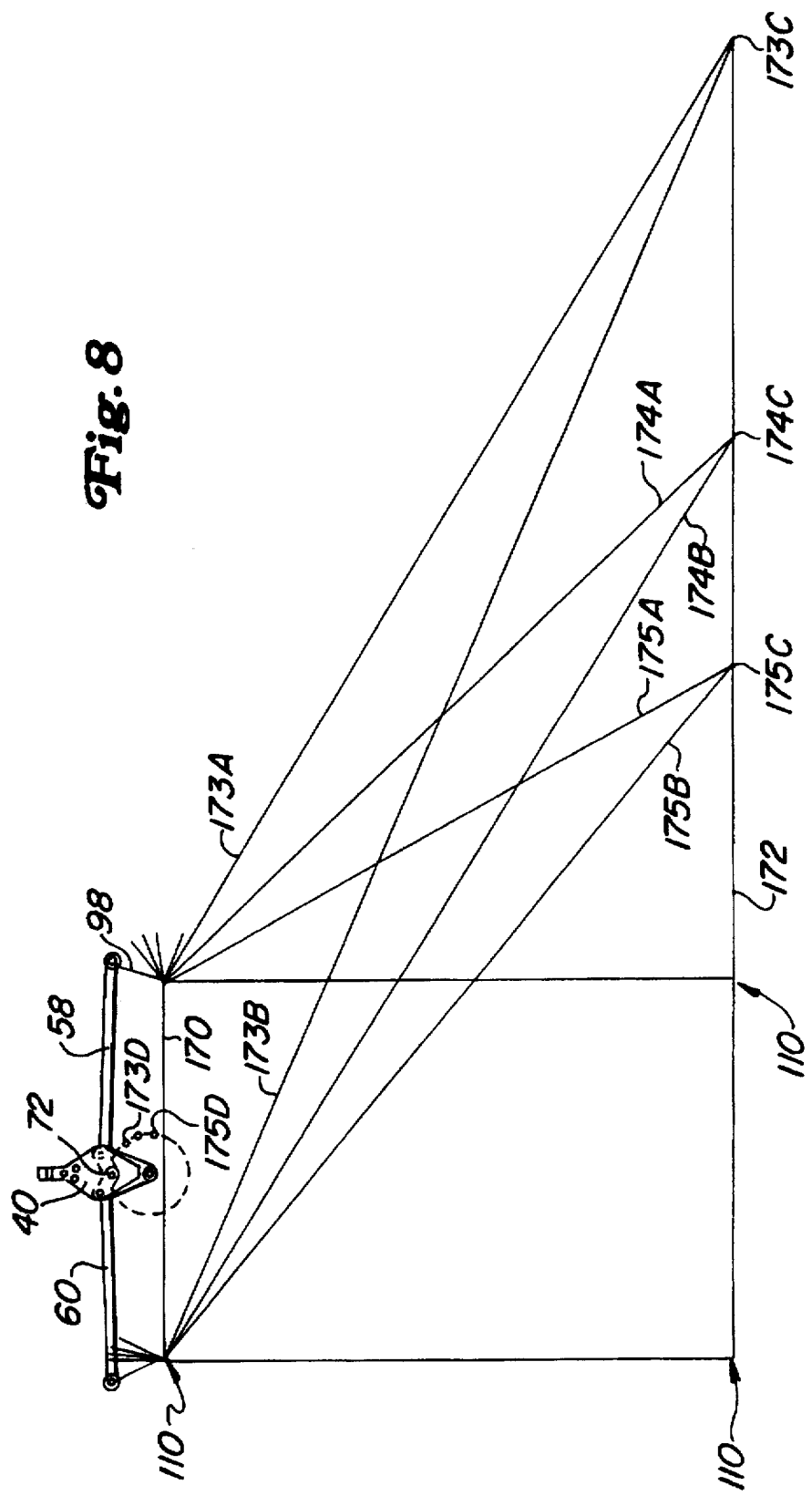
FIG. 8 is a schematic illustration of the corrective steering geometry provided by the present mobile camera crane base.

Turning to FIG. 8, the steering angle compensation of the compensator 40 maintains near perfect steering geometry. Specifically, the ("rear") wheel axis 170 is parallel and collinear with the centers of rotation of the rear ground wheels 122. As the rear wheels are steered left or right, the compensator 40 causes the wheel on the inside of the turn to steer at a sharper angle than the outside wheel, such that the axis of the steered wheels uniformly intersect at the "front" wheel axis 172. For example, 173A and 173B indicate the left and right wheel axes, with the wheels steered at about a 45 degree angle, with axes 173A and 173B intersecting at intersection point 173C. Axes 174A and 174B, showing an increased steering angle, intersect at point 174C, also on the front wheel axes 172. Axes 175A and 175B, representing close to the sharpest turn possible, intersect at intersection point 175C, also on the front wheel axes 172. Points 173D and 175D indicate the movement of the center pin 72 during corrective steering. As the structure and operation of the mobile base 20 is substantially the same from front to back, either end may be considered the "front."

In operation, the mobile base 20 is transported the filming location. If the mobile base 20 cannot be readily rolled to the location, it can be quickly dismantled to reduce carrying weight and size, and also initially to facilitate shipping. In the dismantled state, the centerpost 24 and turn buckles 28, ground wheels 122 (with accompanying axles 94) and the handles 100 are removed from the chassis 22. The remaining chassis weight, in a preferred embodiment of about 270 pounds, can then be more easily carried by a camera crew. The centerpost 24 and turn buckles 28, in the embodiment shown, weigh about 80 pounds.

At the location, the wheels are installed at each corner by removing the jackscrew 110 and extending the axle 94 through the hub 92 until the locking holes 96 in the axle 94 and hub 92 align. A quick release axle lockpin 95 is then installed through those holes to lock the axle 94 to the hub 92. The jackscrew 110 is replaced and passes through a clearance hole in the axle 94. The centerpost 24 is attached to the cross bar 25 using a large quick release pin 26, and the lower ends of the turn buckles 28 are similarly attached at the support arms 30 with quick release pins 29. One or both handles 100 are attached to the tab lug 59 on the compensator housing 41 at each end also using a quick release or aircraft style pin 101. A crane arm or other payload is typically then mounted onto the top of the centerpost 24. The lead weights 38, which are carried separately are added onto the back end of the arm and into the weight buckets as needed.

Figure 5C:
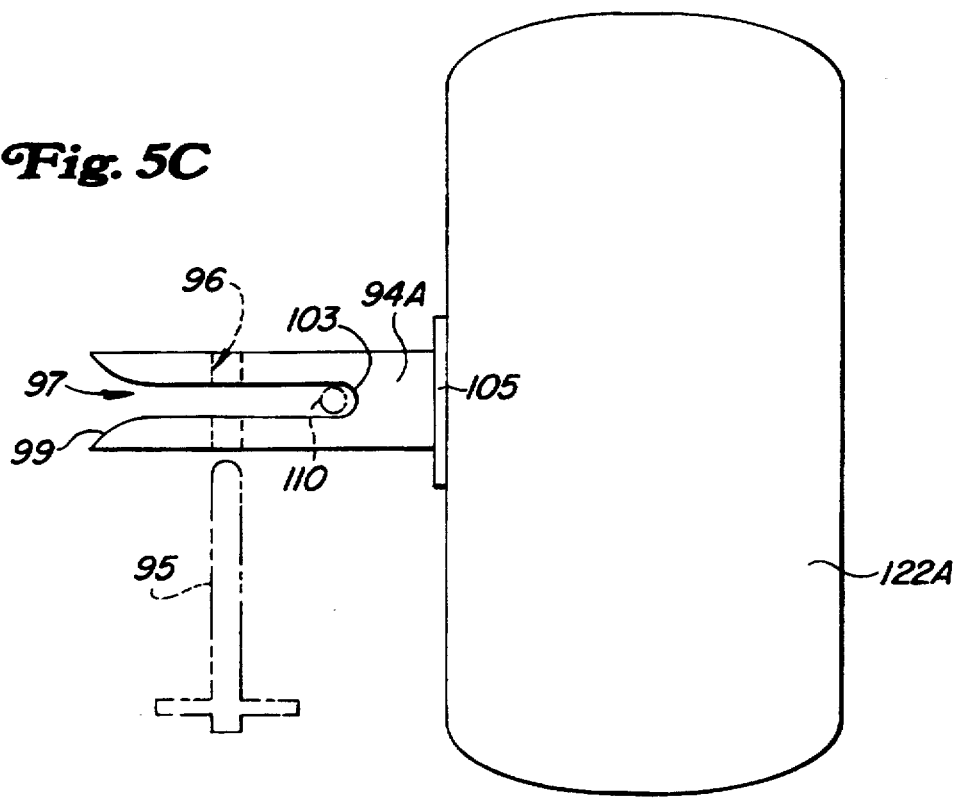
FIG. 5C is a plan view of an alternative embodiment axle.

In an alternative embodiment shown in FIG. 5C, an axle 94A is attached to a wheel 122A through a wheel bearing. The axle 94A has a slot 97 with radiused ends 99. A locking pin hole 96 passes through the axle 94A and slot 97. In use, the axle 94A is installed into the kingpin/axle housing 90 in the same way as axle 94 shown in FIG. 5. The radiused ends 99 are contoured so that the axle 94A is somewhat self-aligning around the shaft section 118 of the jackscrew 110. Accordingly, the slot 97 in the axle 94A may be somewhat misaligned from a purely vertical position, as the interaction of the radii 99 will tend to properly vertically orient the slot. The axle 94A is moved into the hub 92 until the shoulder 105 contacts the hub 92, and the end of the slot 103 is close to the jackscrew 110. The pin hole 96 in the axle 94A then aligns with the pin hole in the hub 92. The pin 95 is installed through the axle 94A and hub 92 to secure the axle and wheel in place.

In contrast to the embodiment of FIG. 5, the embodiment shown in FIG. 5C allows the wheels to be removed and installed without removing the jackscrew 118. This feature saves time when switching wheels, or during set up or take down of the camera crane base. The slotted axles 94A also allow the jackscrews 118 to be used as jacking points, as the wheels can be changed over while the crane base is supported on the jackscrews. Manual lifting by crew members, or a separate jack, is accordingly not required to change wheels.

Figure 9:
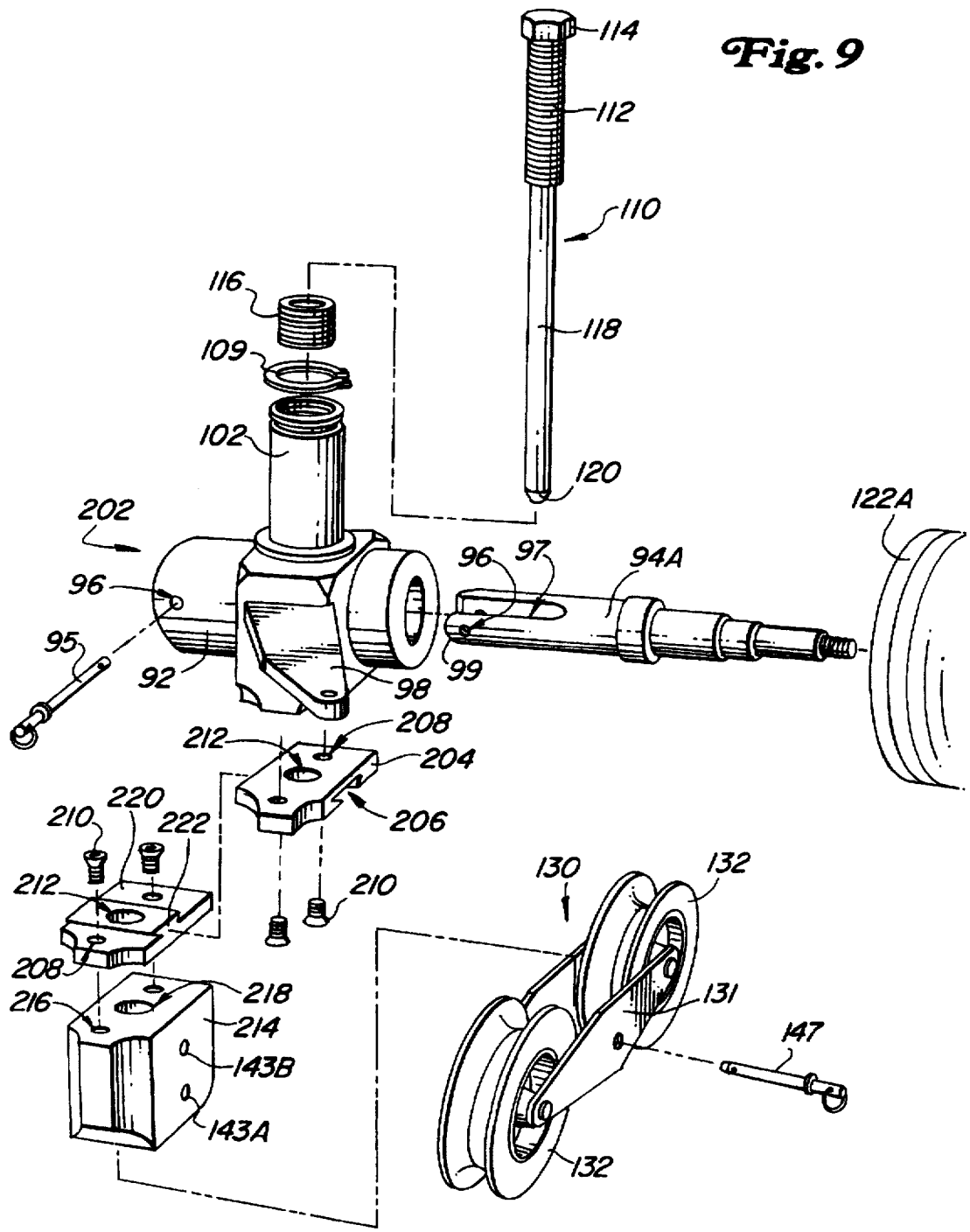
FIG. 9 is an exploded perspective view of an alternative kingpin/axle housing embodiment.

In another preferred embodiment 200, as shown in FIG. 9, a kingpin/axle housing 202 has a lower block 214 (similar to the embodiment of FIGS. 4 and 5), but with the lower block 214 detachable from the kingpin/axle housing 202. An upper dovetail plate 204 has a dovetail slot 206, which extends parallel to the axle bore or axle 94A extending laterally through the kingpin/axle housing 202. The upper dovetail plate 204 is attached to the kingpin/axle housing 202 by flathead screws 210 extending through clearance holes 208 in the upper dovetail plate 204 and threaded into the lower end of the kingpin/axle housing 202. A jack screw clearance hole 212 is provided approximately centrally through the upper dovetail plate 204.

Referring still to FIG. 9, a lower dovetail plate 220 similarly has a dovetail 222 and screws 210 passing through clearance holes 208, and into threaded holes 216 in the lower block 214, to attach the lower dovetail plate 220 to the lower block 214. Of course, other ways of attaching the upper and lower dovetail plates may be used. Alternatively, the dovetail features may simply be machined into the kingpin/axle housing 202 and lower block 214. A slotted cap 101 is preferably placed over the inside of the hub 92, to shield the axle bore from dirt, sand, etc. The upper and lower dovetail plates 204, 220 are preferably steel, while the kingpin/axle housing 202 and lower block 214 are aluminum. The other features and operation of the embodiment 200 shown in FIG. 9 are similar to those of FIGS. 4 and 5, as described above.

In operation, for rolling on ground (on the pneumatic tires 122) the track wheel assembly 130 and lower block 214 are not used or installed and the jackscrew 110 is removed (at each kingpin). Without the lower block 214 installed, the ground clearance of the mobile base is increased approximately to the height G in FIG. 5. This additional ground clearance is advantageous when rolling over irregular terrain, e.g., grass, sand, etc.

For use on track, the lower block 214 is quickly and easily installed onto the kingpin/axle housing 202 by laterally sliding the dovetail 222 into the dovetail slot 206. When the flat left and right side surfaces of the upper and lower dovetail plates align, the jackscrew clearance holes 212 and 218 also align. The jackscrew 110 is then installed and prevents lateral movement between the lower block 214 and kingpin/axle housing 202. The dovetail connection prevents vertical or longitudinal displacement, and the jackscrew prevents lateral movement, so that the lower block 214 is securely attached to the kingpin/axle housing 202. As ground clearance is not ordinarily a factor when operating on track, the reduced ground clearance resulting from the installation of the lower block 214 is not significant. The track wheel assembly 130 may be left on the lower block 214 (via pin 147) passing through plates 131 and clearance hole 143a or 143b. With the lower block 214 secured to the kingpin/axle housing 202, the assembly 130 can be raised or lowered by adjustment of pin 147. The higher position (using hole 143B) gives extra ground clearance for the track wheels, while having them stay assembled onto the mobile base. The lower position (using hole 143A) is preferred for track use.

For use on the ground or floor, the compensator 40 provides three steering modes: straight ahead; corrective or conventional; and crab. As shown in FIGS. 2 and 3, two storage holes 68 and 70 in the compensator housing 41 hold two "crab" quick release pins 84 for storage. For straight ahead steering, the crab pins 84 are installed into the left and right crab steering holes 74, 74A and 76, 76A in the housing 41 and in the links 58 and 60, and the center pin 82 is installed into the center holes 72, 72A. With the three pins installed, the compensator housing 41 is locked against movement to either side, and the wheels 122 are locked in a straight ahead position.

Referring to FIGS. 2 and 3, for compensated or corrective steering, a quick release pin 82 is placed through the center holes 72A in the compensator housing 41 and passes through the center holes 72 of the left and right links 58 and 60. The mobile base 20 is steered by moving the handle 100 to one side. The geometry of the compensator 40 causes the left and right front wheels to steer as shown in FIG. 8. The wheels at the other end of the mobile base 20 would typically be locked into the straight ahead position. The steering angle variation provided by the compensator 40 operating in the corrective steering mode is designed for the front to back spacing of the front and rear wheels, i.e., different wheel bases require different corrective steering geometries, as is well known in the art. The dimensions, angles and positions shown in the figures are generally proportionally correct and reflective of the preferred embodiment.

For crab mode steering, the left and right side crab steering pins 84 are installed into the left and right crab steering holes 74, 74A, 76 and 76A, and the center pin 82 is removed and placed into a storage hole. In this configuration, the left and right wheels 122 are steered to the same angle (with no steering angle correction provided). With both compensators 40 in crab steering mode, all four wheels 122 can be aligned, to allow the mobile base 20 to move diagonally, with both handles 100 attached at each end, and an operator steering with each handle. The sharpest or maximum steering angle is reached when the housing 41 comes to rest against the end beam, which stops further housing pivoting movement.

The best steering modes for each compensator 40, alone or in combination, for a specific application will be readily known to skilled camera dolly/crane operators.

For operation on track, as shown in FIG. 4, the bogey wheels 132 are supported on the top surface 144 of the track 142, with the ground wheels 122 suspended over the ground 146. (The solid line 146 in FIG. 4 illustrates the ground position with the mobile base 20 on the ground wheels 122, with the phantom line 146 indicating the ground position with the mobile base 20 on track). For straight track, use of the straight ahead locked steering mode is preferred, so that any inadvertent sideways movement of the handles 100 will not disrupt rolling movement.

Referring to FIG. 5, for added stability, e.g., when filming in windy or other adverse conditions, the jackscrews 110 may be used as jacking posts. The nut or hex 114 on each jackscrew 110 may be turned with a tool or wrench stored in the tool box 39, causing the jackscrew to extend out from the bottom of the kingpin/axle housing. Jacking pads 124 are removed from the tool box 39 and are placed on the ground and aligned with the end 120 of the jackscrews 110. As the jackscrews 110 move downwardly, the weight of the mobile base 20 and payload is transferred from the relatively softer support of the wheels 122 to the more rigid structures of the jackscrews 110.

Thus, a novel mobile camera crane base has been shown and described. Various modifications and changes may of course be made to the preferred embodiments illustrated. For example, the shape and appearance of the mobil base 20, compensator 40, and kingpin/axle housing, and other components, may have other forms within the scope of the invention but not separately illustrated. Various equivalents for the components, materials, preferred methods of manufacture, assembly and temporary attachments may also be used. The invention, therefore, should not be limited, except by the following claims.

I claim:

1. A mobile camera crane base comprising:
   a chassis having a front beam and a rear beam;
   a pair of front wheels pivotally supported on the front beam;
   a pair of rear wheels pivotally supported on the rear beam;
   a from wheel steering angle compensator linked to the pair of front wheels;
   a rear wheel steering angle compensator linked to the pair of rear wheels; and
   the front and rear wheel steering angle compensators including means for shifting between a corrective steering mode and a crab steering mode.

2. The mobile base of claim 1, wherein at least one of the front and rear steering angle compensators is pivotally mounted to the chassis.

3. The mobile base of claim 1, wherein the chassis is substantially symmetrical from front to back.

4. The mobile base of claim 1, wherein the chassis is substantially symmetrical from side to side.

5. The mobile base of claim 1, further comprising a center post mounted to the chassis and pivotable side to side and front to back.

6. The mobile base of claim 1 wherein the means for shifting comprises pins placeable into and removable from center and crab holes in the compensator.

7. The mobile base of claim 1 wherein the compensator further comprises means for locking the left and right wheels in a straight ahead position.

8. The mobile base of claim 1, wherein the front and rear steering angle compensators are substantially identical.

9. The mobile base of claim 1, wherein the front steering angle compensator includes means for causing the axis of front left and right wheels to substantially uniformly intersect at a rear wheel axis extending perpendicularly through the rear wheels, regardless of the steering directions of the front wheels.

10. The camera crane base of claim 9 further comprising a steering arm attached to the king pin/axle housing, and forming an acute angle with the wheel axle.

11. A steerable camera crane base comprising:
    a rectangular chassis having four corners, with a king pin block at each corner;
    a king pin/axle housing pivotally mounted in each king pin block and having a king pin bore and a wheel axle bore;
    a wheel having an axle extending into the wheel axle bore; and
    a jackscrew extending through the king pin bore, perpendicular to the wheel axle and having a screw thread engagement between the jackscrew and the king pin/axle housing.

12. The steerable camera crane base of claim 11, wherein the jackscrew passes through a slot in the wheel axle.

13. The camera crane base of claim 11 further comprising a lower block attached to a lower end of the king pin/axle housing and a bogey track wheel assembly pivotally attached to the lower block.

14. The camera crane base of claim 13 wherein the lower block is attached to the lower end of the king pin/axle housing.

15. The camera crane bore of claim 12 wherein the slot extends in the axle in a direction perpendicular to the wheel.

16. A mobile camera crane base comprising:
    a chassis having a front beam and a rear beam;
    a pair of front wheels pivotally supported on the front beam;
    a pair of rear wheels pivotally supported on the rear beam;
    a front wheel steering angle compensator linked to the pair of front wheels; and
    a rear wheel steering angle compensator linked to the pair of rear wheels, with at least one of the steering angle compensators including a top plate, a center plate, and a bottom plate, and a center hole and left and right crab steering holes extending through the plates.

17. The mobile base of claim 16 further comprising left and right steering links connected into the steering angle compensator, each steering link having an end segment including a center hole and crab hole.

18. The mobile base of claim 17, wherein the end segment of the left steering link is positioned between the bottom plate and the center plate, and the end segment of the right steering link is positioned between the center plate and the top plate, with a pin extending through the center holes in the plates and the end segments.

19. A steerable camera crane base comprising:
   a rectangular chassis having four corners, with a king pin block at each corner;
   a king pin axle housing pivotally mounted in each king pin block and having a king pin bore and a wheel axle bore;
   a wheel having an axle extending into the wheel axle bore; and
   a jackscrew extending through the king pin bore, perpendicular to the wheel axle, and also extending through a hole or slot in the wheel axle.

* * * * *